United States Patent
Chien et al.

(10) Patent No.: US 7,986,134 B2
(45) Date of Patent: Jul. 26, 2011

(54) POWER SUPPLIES, POWER SUPPLY CONTROLLERS, AND POWER SUPPLY CONTROLLING METHODS

(75) Inventors: Min Chu Chien, Hsinchu (TW); Yung-Peng Huang, Taipei (TW)

(73) Assignee: uPI Semiconductor Corp., Zhubei (TW)

( * ) Notice: Subject to any disclaimer, the term of this patent is extended or adjusted under 35 U.S.C. 154(b) by 476 days.

(21) Appl. No.: 12/234,137

(22) Filed: Sep. 19, 2008

(65) Prior Publication Data

US 2009/0267573 A1 Oct. 29, 2009

Related U.S. Application Data

(60) Provisional application No. 60/991,614, filed on Nov. 30, 2007.

(51) Int. Cl.
*G05F 1/40* (2006.01)
(52) U.S. Cl. ........................................ 323/284; 323/282
(58) Field of Classification Search .......... 323/282–288, 323/272–274, 290, 224, 222; 363/50, 56.02, 363/98, 132, 19–20, 25; 324/713
See application file for complete search history.

(56) References Cited

U.S. PATENT DOCUMENTS

| 6,246,220 B1 * | 6/2001 | Isham et al. | 323/224 |
| 7,327,129 B2 * | 2/2008 | Chen et al. | 323/285 |

* cited by examiner

*Primary Examiner* — Rajnikant B Patel
(74) *Attorney, Agent, or Firm* — Wang Law Firm, Inc.; Li K. Wang

(57) ABSTRACT

A power supply controller is provided. The power supply controller includes a switching device, an inductor, a comparator, and a sensing device. The switching device is coupled to an input power source and switches according to a comparing result. The inductor is coupled between the switching device and an output terminal, and conducts an inductor current. The comparator is coupled to the output terminal, a reference power source and a bias voltage, compares the voltage level of the output voltage and the reference voltage, and outputs the comparing result according to the bias voltage. The sensing device is coupled to the inductor and the comparator, senses the inductor current, generates a sensed voltage according to the inductor current, and adjusts the bias voltage according to the sensed voltage.

22 Claims, 8 Drawing Sheets

POWER SUPPLIES, POWER SUPPLY CONTROLLERS, AND POWER SUPPLY CONTROLLING METHODS

CROSS REFERENCE TO RELATED APPLICATIONS

This application claims the benefit of U.S. Provisional Application No. 60/991,614, filed Nov. 30, 2007.

BACKGROUND OF THE INVENTION

1. Field of the Invention

The invention relates to a constant on time buck converter, and more particularly, to a constant on time buck converter with small equivalent series resistance.

2. Description of the Related Art

A buck converter is a step-down DC to DC converter. Its design is similar to the step-up boost converter, and like the boost converter, it is a switched-mode power supply (SMPS) that uses two switches.

As well known in the Art, the simplest way to reduce a DC voltage is to use a voltage divider circuit. But voltage dividers waste energy since they operate by bleeding off excess voltage as heat. A buck converter, on the other hand, is not only a self-regulating DC to DC converter (output voltage varies with input voltage), but also may be remarkably efficient by wasting minimal energy. Thus, the buck converter is one of the most popular power supply converters used in many electronic devices.

FIG. 1 shows a conventional constant on time (COT) buck converter 100. The buck converter 100 comprises two switches SW1 and SW2, an indictor L1, a capacitor C1, a loading resistor $R_{LOAD}$, an input volatge $V_{IN}$, a reference voltage $V_{REF}$, a comparator 103, a one shot 104, and an equivalent series resistance (ESR) of the capacitor C1. During the operation of the buck converter 100, the output voltage $V_O$ will be fed back to one terminal of the comparator 103. The comparator 103 compares the voltage of the output voltage $V_O$ with the reference voltage $V_{REF}$, and outputs a corresponding control signal with a predetermined voltage so as to control the one shot 104 to turn on the switch SW1 for a constant time when the output voltage $V_O$ does not exceed the reference voltage $V_{REF}$. Additionally, a constant voltage is output by adjusting the operating time of the switches. FIG. 2 is a figure showing the relationship between the output voltage $V_O$, the reference voltage $V_{REF}$, and the operating time of the switch SW1. As shown in FIG. 2, the switch SW1 is turned on for a constant time interval Ton according to the control signal outputted by the one shot 104 and turned off thereafter. The switch will be turned on again when the the output voltage $V_O$ falls below the reference voltage $V_{REF}$. The operating time of the switch SW1 is controlled by the one shot and is proportional to the input voltage and the output voltage, for example $T_{ON}=K\times(V_O/V_{In})$, wherein K is an adjustable positive number.

Since the constant on time buck converter does not need feedback compensation, it may provide rapid response according to instantaneous change. Conventional constant on time buck converters may be limited by ESR resistance, which may be as large as tens of miliohms to hundreds of miliohms, for providing stable output voltage. Thus, the use of a ceramic capacitor with ESR resistance lower than 10 miliohms is not allowed. FIG. 3A is a figure showing the relationship between time t and the inductor current $i_L$. FIG. 3B is a figure showing the relationships between time t and the voltages across the ESR $V_{ESR}$, wherein curves B1 to B3 respectively represents the measured $V_{ESR}$ voltage curve as the ESR resistance is being increased. FIG. 3C is a figure showing the relationships between time t and the voltage across the capacitor $V_C$, and FIG. 3D is a figure showing the relationships between time t and the output voltage $V_O$, wherein $V_O=V_C+V_{ESR}$, and curves D1 to D3 respectively represents the measured $V_O$ voltage curve as the ESR resistance is being increased. As shown in FIG. 3A to FIG. 3D, the voltage across the ESR $V_{ESR}$ and the inductor current $i_L$ are with the same phase, and the phase of the voltage across the capacitor $V_C$ is delayed with respect to the phase of the inductor current $i_L$ with a predetermined value due to the discharge of the capacitor C1. As the resistance of the ESR decreases, the output voltage $V_O$ will be dominated by the voltage across the capacitor $V_C$ so that the phase of the output voltage $V_O$ will be delayed with respect to the phase of the inductor current $i_L$ and the amplitude of the output voltage $V_O$ will be decreased. As such, system stability is accordingly decreased. On the other hand, as the resistance of the ESR increases, the output voltage $V_O$ will be dominated by the voltage across the ESR $V_{ESR}$ so that the phase of the output voltage $V_O$ will be close to the phase of the inductor current $i_L$ and the amplitude of the output voltage $V_O$ will be increased. As such, system stability is accordingly increased. Although system stability increases as the resistance of the ESR increases, the output ripple voltage also increases according to the increasing resistance.

Thus, an improved design for achieving rapid response time and system stability with small equivalent series resistance by using a simple circuit without feedback compensation is needed.

BRIEF SUMMARY OF THE INVENTION

Power supply controllers and power supplies are provided. An exemplary embodiment of such a power supply controller comprises a switch device, an inductor, a comparator and a sensing device. The switch device is coupled to an input voltage source and switches according to a comparing result. The inductor is coupled between the switch device and an output terminal, and is with an inductor current. The comparator is coupled to the output terminal, a reference voltage source and a bias voltage, compares an output voltage at the output terminal and a reference voltage provided by the reference voltage source, and outputs the comparing result according to the bias voltage. The sensing device is coupled to the inductor and the comparator, senses the inductor current, generates a sensed voltage according to the inductor current, and adjusts the bias voltage according to the sensed voltage.

Another exemplary embodiment of a power supply comprises an input voltage source providing an input voltage, a reference voltage source providing a reference voltage, an output terminal outputting an output voltage, a switch device, an inductor, a comparator and a current sensing device. The switch device is coupled to the input voltage source and switches according to a comparing result. The inductor is coupled between the switch device and the output terminal, and is with an inductor current. The comparator is coupled to the output terminal, the reference voltage source and a bias voltage, compares the output voltage and the reference voltage, and outputs the comparing result according to the bias voltage. The current sensing device is coupled to the inductor and the comparator, senses the inductor current, generates a sensed voltage according to the inductor current, and adjusts the bias voltage according to the sensed voltage.

An exemplary embodiment of a method for controlling an output voltage of a power supply comprises: sensing an inductor current according to the current flowing through an inductor of the power supply, and generating a sensed voltage proportional to the inductor current; generating a bias voltage according to the sensed voltage; comparing the output voltage with a reference voltage and generating a comparing result according to the bias voltage; and controlling the output voltage according to the comparing result.

A detailed description is given in the following embodiments with reference to the accompanying drawings.

BRIEF DESCRIPTION OF DRAWINGS

The invention may be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
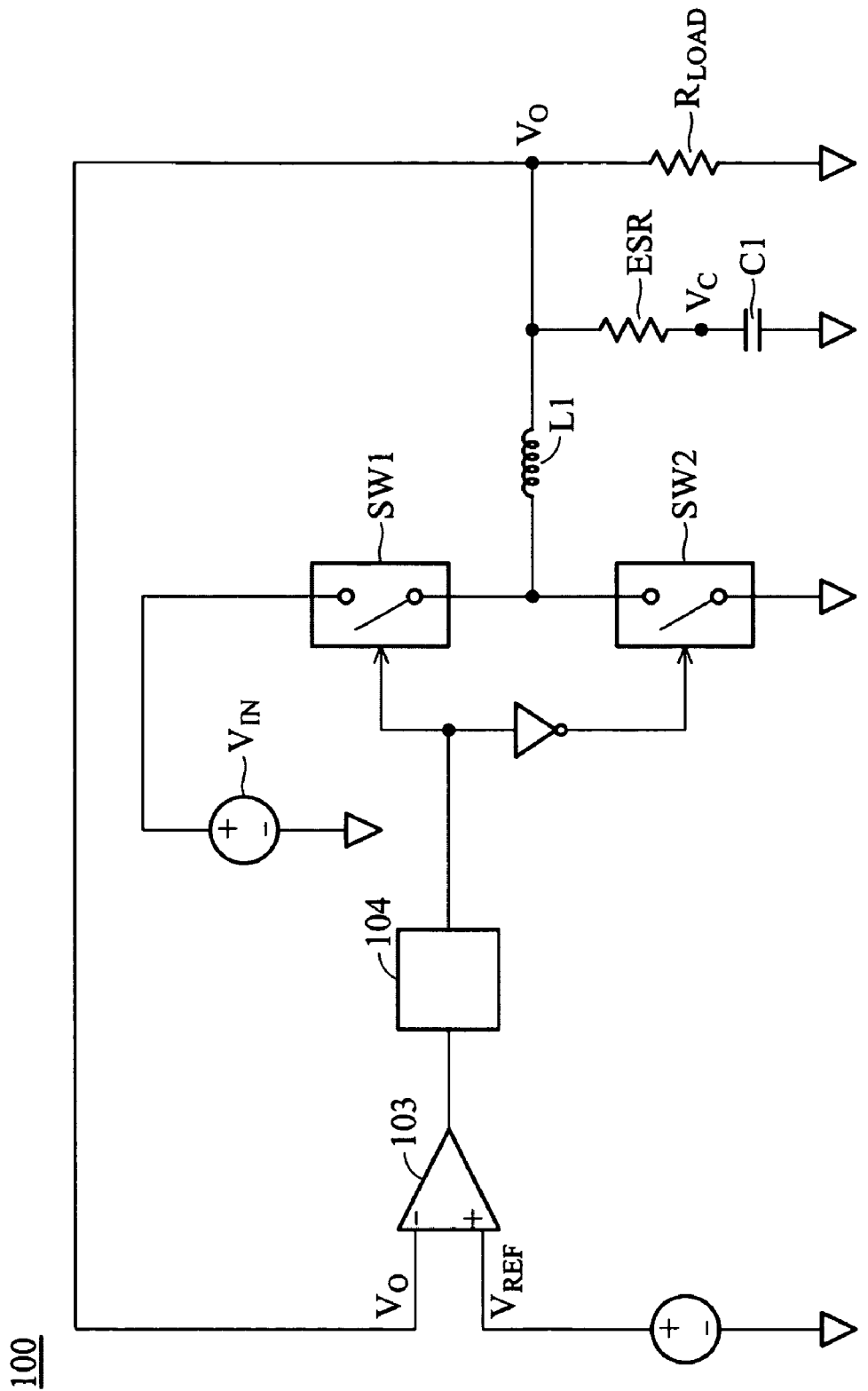
FIG. 1 shows a conventional constant on time buck converter.
Figure 2:
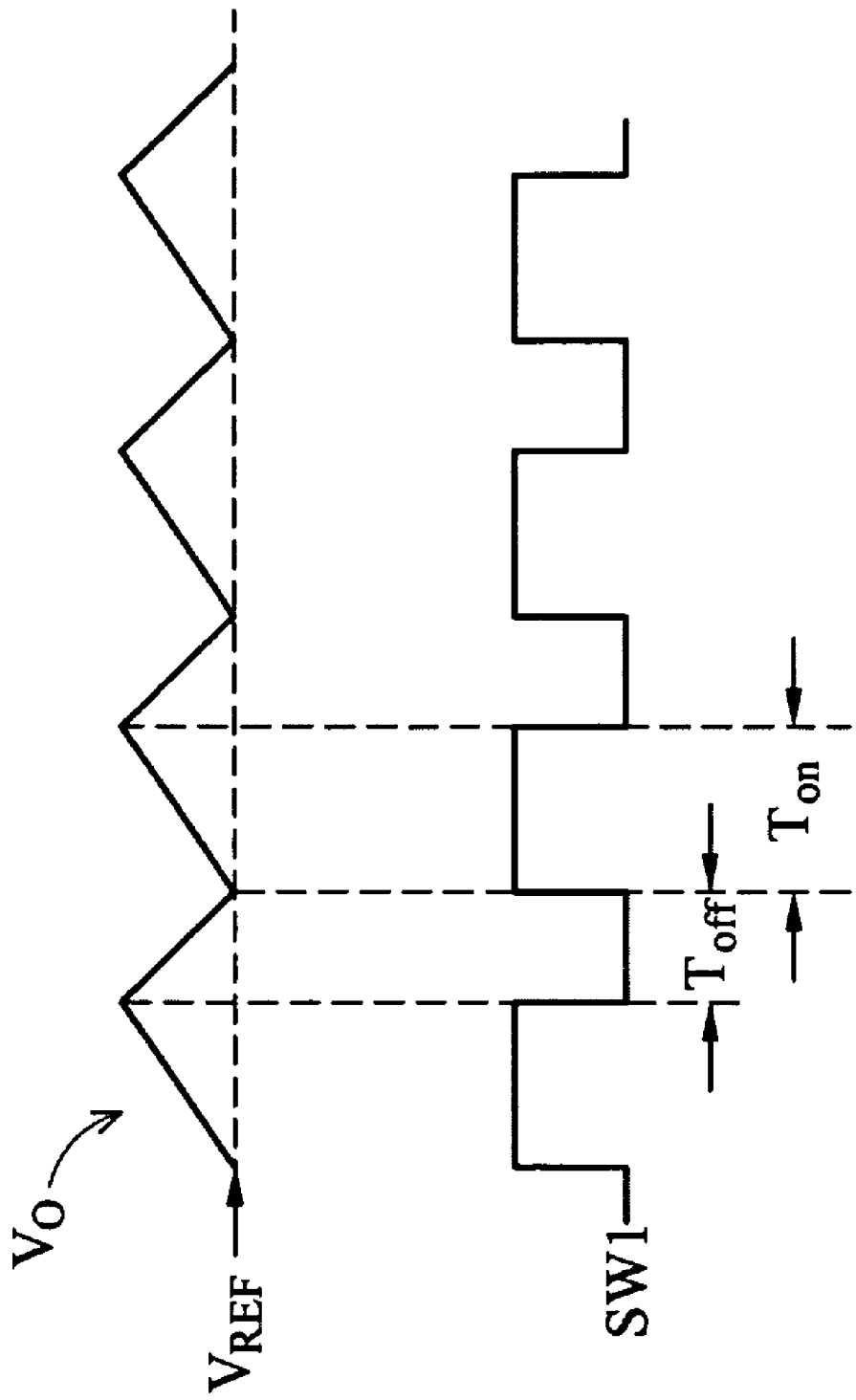
FIG. 2 shows the relationship between the output voltage, the reference voltage, and the operating time of the switch SW1.
Figure 3A:
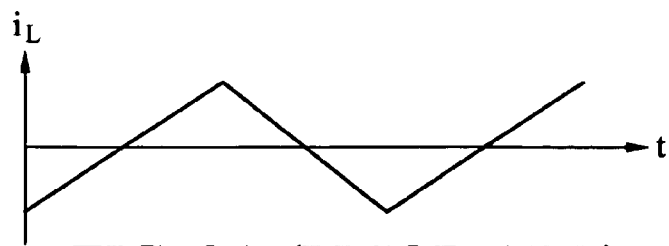
FIG. 3A shows the relationship between time and the inductor current.
Figure 3B:
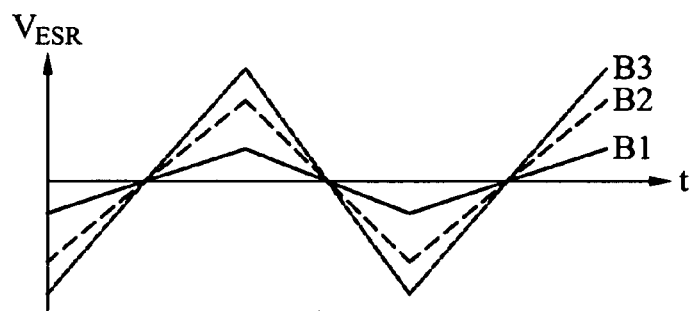
FIG. 3B shows the relationship between time and the voltage across the ESR.
Figure 3C:
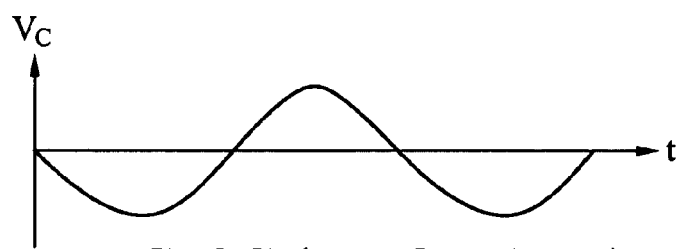
FIG. 3C shows the relationship between time and the voltage across the capacitor.
Figure 3D:
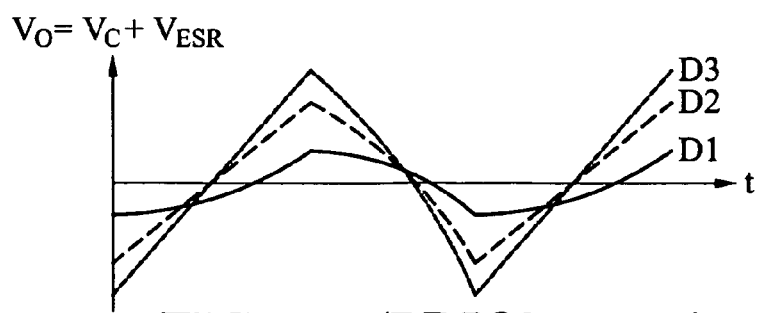
FIG. 3D shows the relationship between time and the output voltage.
Figure 4:
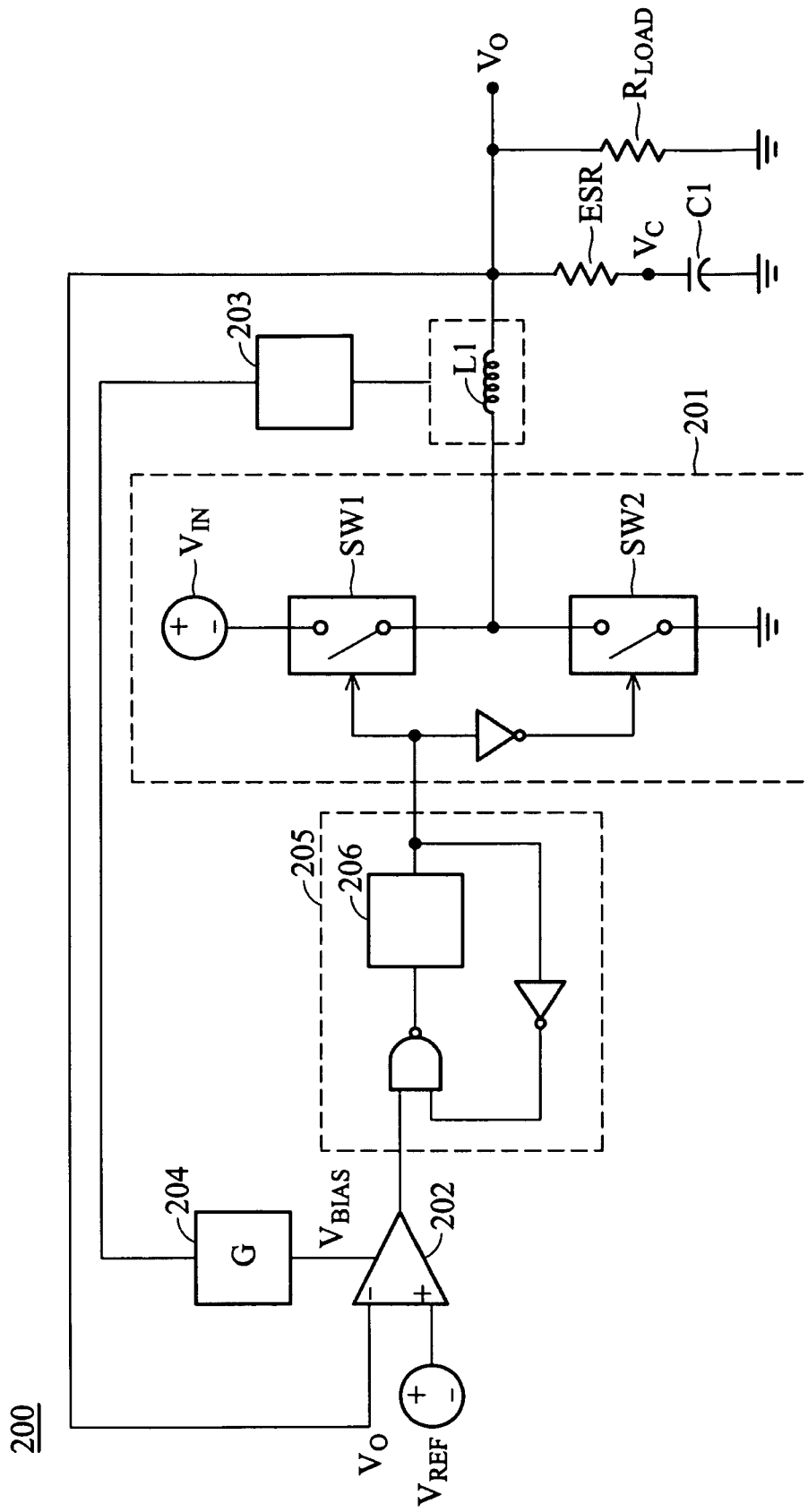
FIG. 4 shows a buck converter according to an embodiment of the invention.

FIG. 4 shows a buck converter 200 according to an embodiment of the invention. The buck converter 200 is a switched-mode power supply (SMPS) and comprises an input voltage source providing an input voltage $V_{IN}$, a reference voltage source providing a reference voltage $V_{REF}$, a switch device 201, a comparator 202, a current sensing device 203, a control circuit 205, an inductor L1, a capacitor C1 and a loading resistor $R_{LOAD}$. The switch device 201 comprises two switches SW1 and SW2 for switching according to a comparing result generated by the comparator 202. The switch SW1 is coupled to the input voltage source, and the switch SW2 is coupled between the switch SW1, the inductor L1 and a ground. The inductor L1 is coupled between the switch device 201 and an output terminal, and is with an inductor current $i_L$. In the buck converter 200, the inductor current $i_L$ is varied via the switching operation of the switch device 201 and an output voltage $V_O$ is accordingly generated at the output terminal.

According to an embodiment of the invention, the comparator 202 is coupled to the output terminal, the reference voltage source and a bias voltage $V_{BIAS}$, compares the output voltage $V_O$ at the output terminal and the reference voltage $V_{REF}$, and outputs the comparing result according to the bias voltage $V_{BIAS}$. The current sensing device 203 is coupled to the inductor L1 and the comparator 202, senses the inductor current $i_L$, generates a sensed voltage $V_{SENS}$ according to the inductor current $i_L$, and adjusts the bias voltage $V_{BIAS}$ according to the sensed voltage $V_{SENS}$, wherein the sensed voltage $V_{SENS}$ is direct proportional to the inductor current $i_L$. According to an embodiment of the invention, the sensed voltage $V_{SENS}$ is input to a bias voltage input terminal of the comparator 202 so as to provide the sensed voltage $V_{SENS}$ as the bias voltage $V_{BIAS}$. According to another embodiment of the invention, the buck converter 200 may further comprises a gain adjusting device 204 coupled between the current sensing device 203 and the comparator 202 for adjusting an amplitude of the sensed voltage $V_{SENS}$ according to a predetermined gain value G, generating a gained voltage, and outputting the gained voltage to the bias voltage input terminal of the comparator 202 so as to provide the gained voltage as the bias voltage $V_{BIAS}$.

Figure 5A:
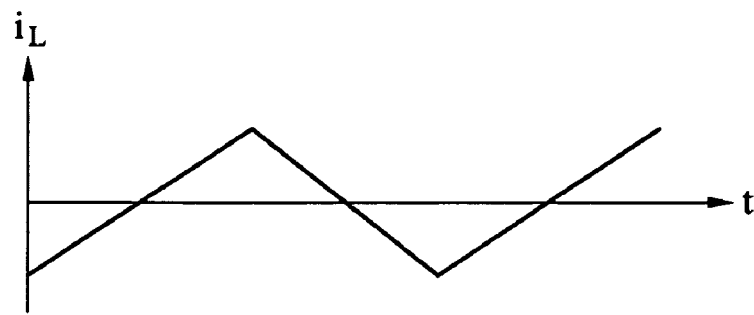
FIG. 5A shows the relationship between time and the inductor current according to an embodiment of the invention.
Figure 5B:
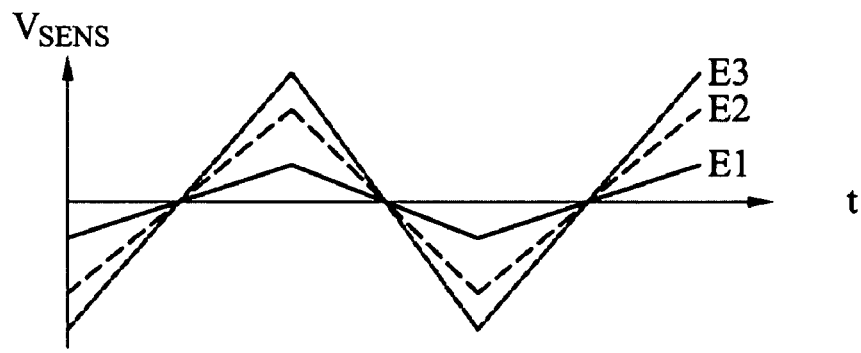
FIG. 5B shows the relationship between time and the sensed voltage according to an embodiment of the invention.

FIG. 5A shows the relationship between time t and the inductor current $i_L$. FIG. 5B shows the relationship between time t and the sensed voltage $V_{SENS}$, wherein the curve E1 represents the sensed voltage $V_{SENS}$ generated by the current sensing device 203, curves E2-E3 represent the gained voltages output by the gain adjusting device 204. By increasing the predetermined gain value G, the amplitude of the gained voltage is accordingly increased, and the slope of the sensed voltage may be efficiently amplified.

According to an embodiment of the invention, the sensed voltage or the gained voltage is input to the bias voltage input terminal of the comparator 202 so as to be provided as the bias voltage $V_{BIAS}$ for generating the comparing result. The bias voltage $V_{BIAS}$ is used to adjust the comparing results with respect to the comparing voltages at the inverting and non-inverting input terminals of the comparator 202. For example, when the reference voltage $V_{REF}$=1V, and the bias voltage $V_{BIAS}$=0V, the output comparing result of the comparator 202 will be transient (e.g. the output comparing result changes from logic low voltage to logic high voltage, or changes from logic high voltage to logic low voltage) when the output voltage $V_O$=1V. When the refenence voltage $V_{REF}$=1V, and the bias voltage $V_{BIAS}$=0.1V, the output comparing result of the comparator 202 will be transient when the output voltage $V_O$=1.1V. When the refenence voltage $V_{REF}$=1V, and the bias voltage $V_{BIAS}$=−0.1V, the output comparing result of the comparator 202 will be transient when the output voltage $V_O$=0.9V. Thus, due to the equivalence relationships, the use of the bias voltage $V_{BIAS}$ may be equivalent to adjust the input comparing voltage at the inverting and non-inverting input terminals of the comparator 202. By adjusting the bias voltage of the comparator 202, the slopes of the equivalent voltages of the comparing voltages at the inverting and non-inverting input terminals of the comparator 202 may be accordingly amplified.

Figure 5C:
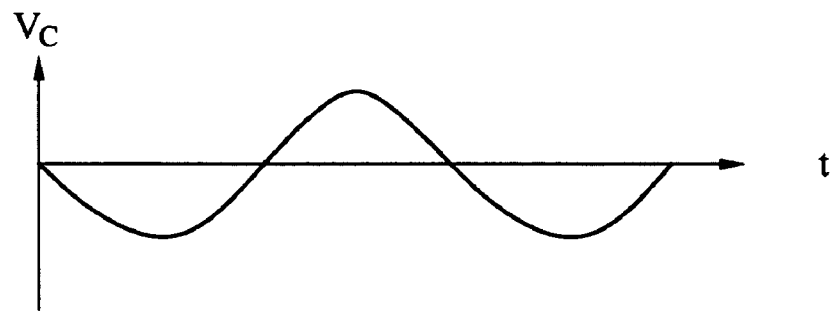
FIG. 5C shows the relationship between time and the voltage across the capacitor according to an embodiment of the invention.
Figure 5D:
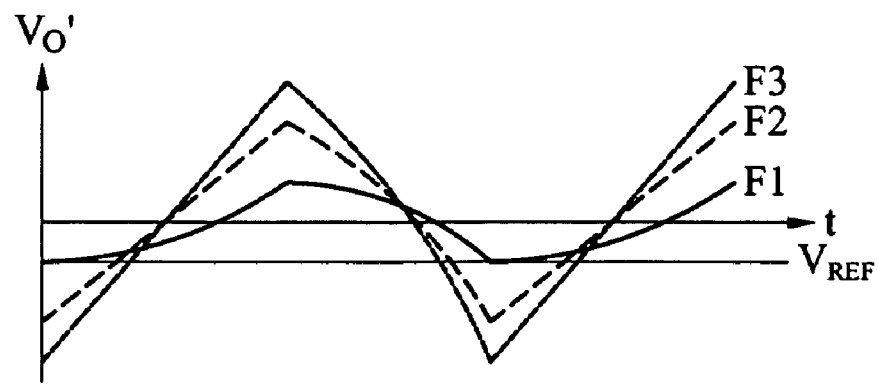
FIG. 5D shows the relationship between time and the equivalent output voltage with the influence of the bias voltage at the bias voltage input terminal of the comparator.
Figure 5E:
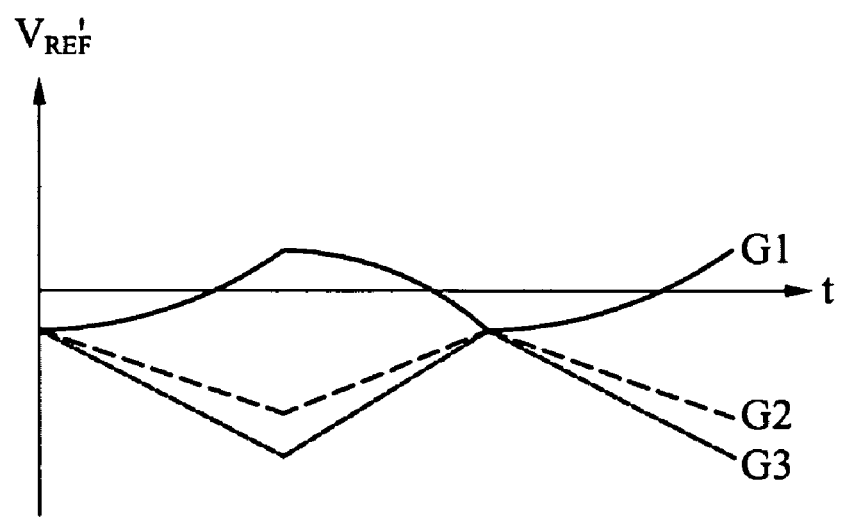
FIG. 5E shows the relationship between time and the equivalent reference voltage with the influence of the bias voltage at the bias voltage input terminal of the comparator.

FIG. 5C shows the relationship between time t and the voltage $V_C$ across the capacitor C1. FIG. 5D shows the relationship between time t and the equivalent output voltage $V_O'$ with the influence of the bias voltage $V_{BIAS}$ at the bias voltage input terminal of the comparator 202. Assuming that the equivalent series resistance ESR is omitted, the output voltage of the buck converter 200 is $V_O=V_C$. Thus, as shown in FIG. 5D, the equivalent output voltage $V_O'=V_C+V_{BIAS}$, wherein the bias voltage $V_{BIAS}$ is the sensed voltage or the gained voltage as shown in FIG. 5B. There are three voltage curves F1-F3 shown in FIG. 5D, wherein the curve F1 represents the equivalent output voltage with the sensed voltage E1, as shown in FIG. 5B, provided as the bias voltage $V_{BIAS}$ of the comparator 202, the curve F2 represents the equivalent output voltage with the sensed voltage E2, as shown in FIG. 5B, provided as the bias voltage $V_{BIAS}$ of the comparator 202, and the curve F3 represents the equivalent output voltage with the sensed voltage E3, as shown in FIG. 5B, provided as the bias voltage $V_{BIAS}$ of the comparator 202. As may be seen from FIG. 5D, with the influence of the bias voltage $V_{BIAS}$, the phase of the equivalent output voltage $V_O'$ is close to that of the inductor current $i_L$, and the amplitude of the equivalent output voltage is also increased. As the bias voltage $V_{BIAS}$ is increased, the voltage difference between the equivalent output voltage $V_O'$ and the reference voltage $V_{REF}$ may also be increased accordingly. Thus, even if the resistance of the equivalent series resistance ESR is small, or a capacitor C1 without the equivalent series resistance ESR is used, the use of the sensed voltage $V_{SENS}$ may increase the signal to noise ratio (SNR) of the reference voltage $V_{REF}$ and the output voltage $V_O$ as the effect of the equivalent series resistance ESR, and the system may remain stable. On the other hand, due to the equivalence relationships, with the sensed voltage $V_{SENS}$ being provided as the bias voltage $V_{BIAS}$, it may also be equivalent to change the voltage of the reference voltage $V_{REF}$. FIG. 5E shows the relationship between time t and the equivalent reference voltage $V_{REF}'$ with the influence of the bias voltage $V_{BIAS}$ at the bias voltage input terminal of the comparator 202, wherein the bias voltage $V_{BIAS}$ is the sensed voltage or the gained voltage as shown in FIG. 5B. There are three voltage curves G1-G3 shown in FIG. 5E, wherein the curve G1 represents the equivalent reference voltage with the sensed voltage E1, as shown in FIG. 5B, provided as the bias voltage $V_{BIAS}$ of the comparator 202, the curve G2 represents the equivalent reference voltage with the sensed voltage E2, as shown in FIG. 5B, provided as the bias voltage $V_{BIAS}$ of the comparator 202, and the curve G3 represents the equivalent reference voltage with the sensed voltage E3, as shown in FIG. 5B, provided as the bias voltage $V_{BIAS}$ of the comparator 202. As may be seen from FIG. 5E, as the bias voltage $V_{BIAS}$ is increased, the amplitude of reference voltage is equivalent increased. Thus, the voltage difference between the output voltage $V_O$ and the equivalent reference voltage $V_{REF}'$ may be increased accordingly. With the influence of the bias voltage $V_{BIAS}$, even if the resistance of the equivalent series resistance ESR is small, or a capacitor C1 without the equivalent series resistance ESR is used, the use of the sensed voltage $V_{SENS}$ may increase the signal to noise ratio (SNR) of the reference voltage $V_{REF}$ and the output voltage $V_O$ as the effect of the equivalent series resistance ESR, and the system may remain stable.

After the comparator 202 generates the comparing result, the comparing result is input to the control circuit 205. The control circuit 205 comprises a one shot 206, controlling the switch SW1 to be turned on within a predetermined time interval Ton according to the comparing result. The predetermined time interval is proportional to the output voltage and the input voltage, such as $T_{ON}=K\times(V_O/V_{IN})$, wherein K is an adjustable positive number. Thus, when the equivalent output voltage $V_O'$ exceeds the reference voltage $V_{REF}$, the switch SW2 is turned on and the switch SW1 is turned off. When output voltage $V_O'$ does not exceed the reference voltage $V_{REF}$, the switch SW1 is turned on within the time interval Ton, and the switch SW2 is turned off within time interval Ton. Thus, with the influence of the bias voltage $V_{BIAS}$, the amplitude of the equivalent output voltage is amplified and the inductor current $i_L$ and the output voltage $V_O$ may be stably generated even when the resistance of the equivalent series resistance ESR is small. In addition, the buck converter 200 may not need feedback compensation, and may thus provide rapid response according to instantaneous change of the loading current.

Figure 7:
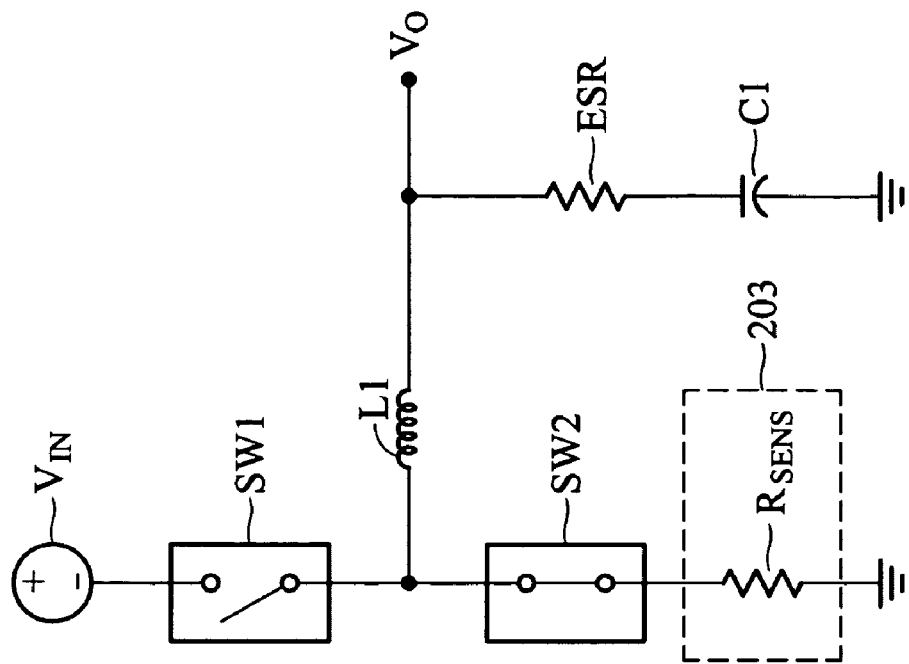
FIG. 7 shows a current sensing device according to another embodiment of the invention.
Figure 6:
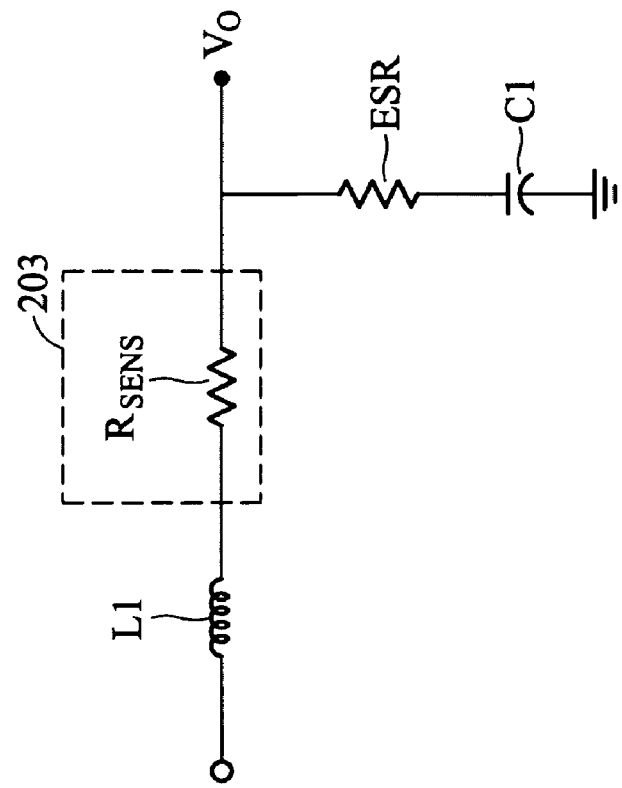
FIG. 6 shows a current sensing device according to an embodiment of the invention.

FIG. 6 shows a current sensing device according to an embodiment of the invention. As shown in FIG. 6, the current sensing device comprises a sensing resistor $R_{SENS}$ coupled in serial with the inductor L1 between the switch device 201 and the output terminal. FIG. 7 shows a current sensing device according to another embodiment of the invention. As shown in FIG. 7, the current sensing device comprises a sensing resistor $R_{SENS}$ coupled in serial with the switch SW2 between the inductor L1 and the ground. It is to be noted that the current sensing device may also be implement by other different circuits and elements capable of generating the sensed voltage or sensed current proportional to the inductor current, and the invention should not be limited thereto.

Figure 8:
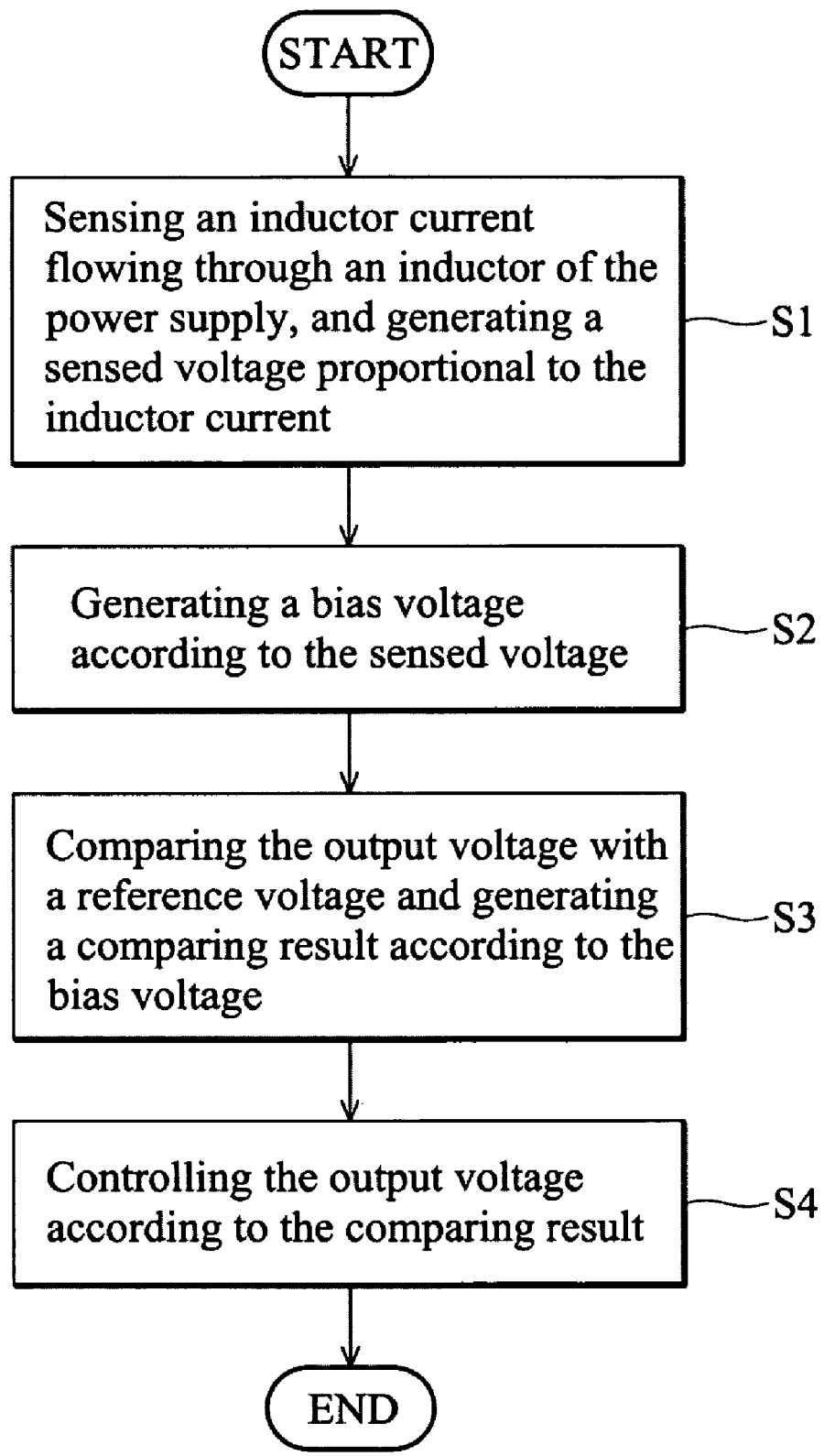
FIG. 8 shows a flow chart of the method for controlling an output voltage of a power supply according to an embodiment of the invention.

FIG. 8 shows a flow chart of the method for controlling an output voltage of a power supply according to an embodiment of the invention. First, an inductor current flowing through an inductor of the power supply is sensed, and a sensed voltage proportional to the inductor current is generated (Step S1). Next, a bias voltage is generated according to the sensed voltage (Step S2). Next, the output voltage is compared with a reference voltage and a comparing result is generated according to the bias voltage (Step S3). Finally, the output voltage is controlled according to the comparing result (Step S4).

Since according to the embodiments of the invention, the voltages input into the inverting and non-inverting terminals of the comparator are equivalently changed by inputting a voltage or current proportional to the inductor current into the bias voltage input terminal of the comparator, the invention is also applicable to adjust the direct current voltage of an equivalent reference voltage $V_{REF}$. The direct current voltage of the output voltage $V_O$ may thus be adjusted according to the loading current and voltage droop may be achieved. In addition, the invention is also applicable in the multi-phase pulse width modulation system to adjust the duty cycles of different channels and achieve current balance.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power supply controller, comprising:
 a switch device coupled to an input voltage source and switching according to a comparing result;

an inductor coupled between the switch device and an output terminal, and with an inductor current;

a comparator coupled to the output terminal, a reference voltage source and a bias voltage, comparing an output voltage at the output terminal and a reference voltage provided by the reference voltage source, and outputting the comparing result according to the bias voltage; and a sensing device coupled to the inductor and the comparator, sensing the inductor current, generating a sensed voltage according to the inductor current, and adjusting the bias voltage according to the sensed voltage.

2. The power supply controller as claimed in claim 1, wherein the sensed voltage is direct proportional to the inductor current.

3. The power supply controller as claimed in claim 1, wherein the sensed voltage is input to a bias voltage input terminal of the comparator so as to provide the sensed voltage as the bias voltage.

4. The power supply controller as claimed in claim 1, further comprising a gain adjusting device coupled between the sensing device and the comparator for adjusting an amplitude of the sensed voltage according to a predetermined gain value and generating a gained voltage, and outputting the gained voltage to a bias voltage input terminal of the comparator so as to provide the gained voltage as the bias voltage.

5. The power supply controller as claimed in claim 1, wherein the switch device comprises:

a first switch coupled to the input voltage source; and a second switch coupled between the first switch, the inductor and a ground, wherein when the first switch is turned on, the second switch is turned off, and when the first switch is turned off, the second switch is turned on.

6. The power supply controller as claimed in claim 5, further comprising a control circuit coupled between the comparator and the switch device for controlling the first switch to be turned on within a predetermined time interval according to the comparing result.

7. The power supply controller as claimed in claim 1, wherein the sensing device comprises a sensing resistor coupled in serial with the inductor between the switch device and the output terminal.

8. The power supply controller as claimed in claim 5, wherein the sensing device comprises a sensing resistor coupled in serial with the second switch between the inductor and the ground.

9. The power supply controller as claimed in claim 6, wherein the predetermined time interval is proportional to the output voltage and an input voltage provided by the input voltage source.

10. A power supply, comprising:

an input voltage source providing an input voltage;

a reference voltage source providing a reference voltage;

an output terminal outputting an output voltage;

a switch device coupled to the input voltage source and switching according to a comparing result;

an inductor coupled between the switch device and the output terminal, and with an inductor current;

a comparator coupled to the output terminal, the reference voltage source and a bias voltage, comparing the output voltage and the reference voltage, and outputting the comparing result according to the bias voltage; and a current sensing device coupled to the inductor and the comparator, sensing the inductor current, generating a sensed voltage according to the inductor current, and adjusting the bias voltage according to the sensed voltage, wherein the sensed voltage is input to a bias voltage input terminal of the comparator so as to provide the sensed voltage as the bias voltage.

11. The power supply as claimed in claim 10, wherein the sensed voltage is direct proportional to the inductor current.

12. The power supply as claimed in claim 10, further comprising a gain adjusting device coupled between the current sensing device and the comparator for adjusting an amplitude of the sensed voltage according to a predetermined gain value and generating a gained voltage, and outputting the gained voltage to a bias voltage input terminal of the comparator so as to provide the gained voltage as the bias voltage.

13. The power supply as claimed in claim 10, wherein the switch device comprises:

a first switch coupled to the input voltage source; and a second switch coupled between the first switch, the inductor and a ground, wherein when the first switch is turned on, the second switch is turned off, and when the first switch is turned off, the second switch is turned on.

14. The power supply as claimed in claim 13, further comprising a control circuit coupled between the comparator and the switch device for controlling the first switch to be turned on within a predetermined time interval according to the comparing result.

15. The power supply as claimed in claim 14, wherein the control circuit is a one shot.

16. The power supply as claimed in claim 14, wherein the predetermined time interval is proportional to the output voltage and the input voltage.

17. The power supply as claimed in claim 10, wherein the current sensing device comprises a sensing resistor coupled in serial with the inductor between the switch device and the output terminal.

18. The power supply as claimed in claim 13, wherein the current sensing device comprises a sensing resistor coupled in serial with the second switch between the inductor and the ground.

19. A method for controlling an output voltage of a power supply, comprising:

sensing an inductor current flowing through an inductor of the power supply, and generating a sensed voltage proportional to the inductor current;

applying the sensed voltage to a bias voltage input terminal of a comparator of the power supply as a bias voltage;

comparing the output voltage with a reference voltage and generating a comparing result according to the bias voltage; and controlling the output voltage according to the comparing result.

20. The method as claimed in claim 19, wherein the output voltage is generated through a switching operation of a switch device coupled between an input voltage source and a ground so as to change the inductor current according to the comparing result.

21. The method as claimed in claim 20, wherein when the output voltage exceeds the reference voltage, the switch device is not coupled to the input voltage source, and when output voltage does not exceed the reference voltage, the switch device is coupled to the input voltage source within a predetermined time interval.

22. The method as claimed in claim 19, further comprising:

adjusting an amplitude of the sensed voltage according to a predetermined gain value to generate a gained voltage; and generating the bias voltage according to the gained voltage.

* * * * *